United States Patent [19]

Takahashi et al.

[11] Patent Number: 5,697,337
[45] Date of Patent: Dec. 16, 1997

[54] ENGINE ROTATION SPEED CONTROLLER

[75] Inventors: Nobutaka Takahashi, Yokohama; Makoto Yamashita, Tokyo; Yoshitaka Deguchi, Yokosuka, all of Japan

[73] Assignee: Nissan Motor Co., Ltd., Kanagawa, Japan

[21] Appl. No.: 757,846

[22] Filed: Nov. 27, 1996

[30] Foreign Application Priority Data

Nov. 30, 1995 [JP] Japan ................................. 7-312643

[51] Int. Cl.[6] ..................... F02D 41/16; F02P 5/15
[52] U.S. Cl. ..................... 123/339.11; 123/339.23
[58] Field of Search .................. 123/339.11, 339.19, 123/339.23

[56] References Cited

U.S. PATENT DOCUMENTS

| 4,884,540 | 12/1989 | Kishimoto et al. | 123/339.11 |
|---|---|---|---|
| 5,065,717 | 11/1991 | Hosokai et al. | 122/339.23 |
| 5,133,319 | 7/1992 | Ikeda et al. | 123/339.11 |
| 5,136,997 | 8/1992 | Takahashi et al. | 123/339.23 |
| 5,463,993 | 11/1995 | Livshits et al. | 123/339.11 |
| 5,517,964 | 5/1996 | Chen et al. | 123/339.11 |
| 5,564,387 | 10/1996 | Igarashi et al. | 123/339.23 |

FOREIGN PATENT DOCUMENTS

| 57-83665 | 5/1982 | Japan . |
|---|---|---|
| 5-71456 | 3/1993 | Japan . |

*Primary Examiner*—Willis R. Wolfe
*Attorney, Agent, or Firm*—Lowe, Price, LeBlanc & Becker

[57] ABSTRACT

An engine rotation speed during idle running is feedback controlled to a target rotation speed. A basic ignition timing is set based on the rotation speed during idle running, and the ignition timing is feedback corrected based on a difference between a target rotation speed and a measured rotation speed. This feedback correction process and other processes including the setting of the basic ignition timing are separated. A high response ignition timing feedback control is performed by advancing the measuring timing of the rotation speed to a point earlier than the correction timing by at least the processing time required to perform the feedback correction process, and preferably by a value near the processing time. A high response fuel injection amount feedback control may also be performed by a similar process.

8 Claims, 6 Drawing Sheets

5,697,337

ENGINE ROTATION SPEED CONTROLLER

FIELD OF THE INVENTION

This invention relates to feedback control of engine rotation speed during idle running.

BACKGROUND OF THE INVENTION

Tokkai Sho 57-83665 published by the Japanese Patent Office in 1982 discloses a technique for feedback control of rotation speed to a target value during idle running of an engine, wherein an engine speed drop or variation is detected, and an ignition timing or air-fuel ratio is controlled so as to suppress the drop.

Tokkai Hei 5-71456 published by the Japanese Patent Office in 1993 discloses how the ignition timing is corrected according to a variation amount of the engine rotation speed, and a predetermined limit is applied to this correction according to engine running conditions.

In such an idle rotation speed controller, the ignition timing or air-fuel ratio is controlled so that the engine rotation speed coincides with a target rotation speed. In this case, to achieve high response control, the measurement timing and computation timing of rotation speed are of utmost importance.

When there is even a slight change of load, including load variations of peripheral instruments during idle running, the engine speed also varies. If rotation speed information is old, the correction of the rotation speed is delayed by a corresponding amount. Even when the measured rotation speed is recent, if the computation for setting or correcting the ignition timing or air-fuel ratio is delayed, no correction in response to the rotation speed variation is made during this delay and so the response deteriorates.

However, conventional idle rotation speed controllers did not give much consideration to optimization of rotation speed measurement timing or of computation timing to set or correct the ignition timing or air-fuel ratio based on the rotation speed. In other words, conventional controllers merely measured the engine rotation speed, processed this information so as to compute a setting or correction of the ignition timing or air-fuel ratio, and controlled the ignition timing or air-fuel ratio based on the computed result.

One way for performing idle rotation speed control with high response is to use a computer with sufficiently high performance and high speed, but this inevitably led to cost increases.

SUMMARY OF THE INVENTION

It is therefore an object of this invention to perform idle rotation speed control with high response without using a costly high performance device.

In order to achieve the above object, this invention provides a controller for feedback control of a rotation speed of an engine during an idle running state to a target rotation speed, comprising a mechanism for periodically measuring a rotation speed of the engine during the idle running state, a mechanism for setting a basic engine combustion condition during the idle running state based on the measured rotation speed, a mechanism for setting a target rotation speed of the engine during the idle running state, and a mechanism for executing a feedback correction process which corrects the basic engine combustion condition such that the measured rotation speed coincides with the target rotation speed. In this controller a time period from rotation speed measurement by the measuring mechanism to completion of the feedback correction process is set to be equal to or longer than a time required to perform the feedback correction process, but shorter than a time required from setting of the basic engine combustion condition to the completion of the feedback correction process.

It is preferable that the time period from the rotation speed measurement to the completion of the feedback correction process is set approximately equal to the time period required to perform the feedback correction process.

It is also preferable that the basic engine combustion condition setting mechanism sets the basic engine combustion condition based on a rotation speed measured prior to the latest measurement of rotation speed.

The basic combustion condition is, for example, an ignition timing of fuel supplied to the engine. In this case the completion of the feedback correction process is set to be in the vicinity of compression top dead center in an engine cylinder.

Alternatively, the basic combustion condition is a fuel supply amount to the engine. In this case the completion of the feedback correction process is set equal to a fuel supply timing to the engine.

It is also preferable that the feedback correction process comprises a process which determines whether or not to perform feedback correction based on a rotation speed measured on an immediately preceding occasion.

It is also preferable that the controller further comprises a mechanism for determining whether or not to perform feedback correction based on conditions other than engine rotation speed, and when the mechanism determines that the feedback correction should not be performed, the feedback correction process sets a correction amount by the feedback correction process to 0.

It is also preferable that the feedback correction process comprises a process for limiting a correction amount by the feedback correction process to a predetermined tolerance range.

The details as well as other features and advantages of this invention are set forth in the remainder of the specification and are shown in the accompanying drawings.

DESCRIPTION OF THE PREFERRED EMBODIMENTS

Figure 1:
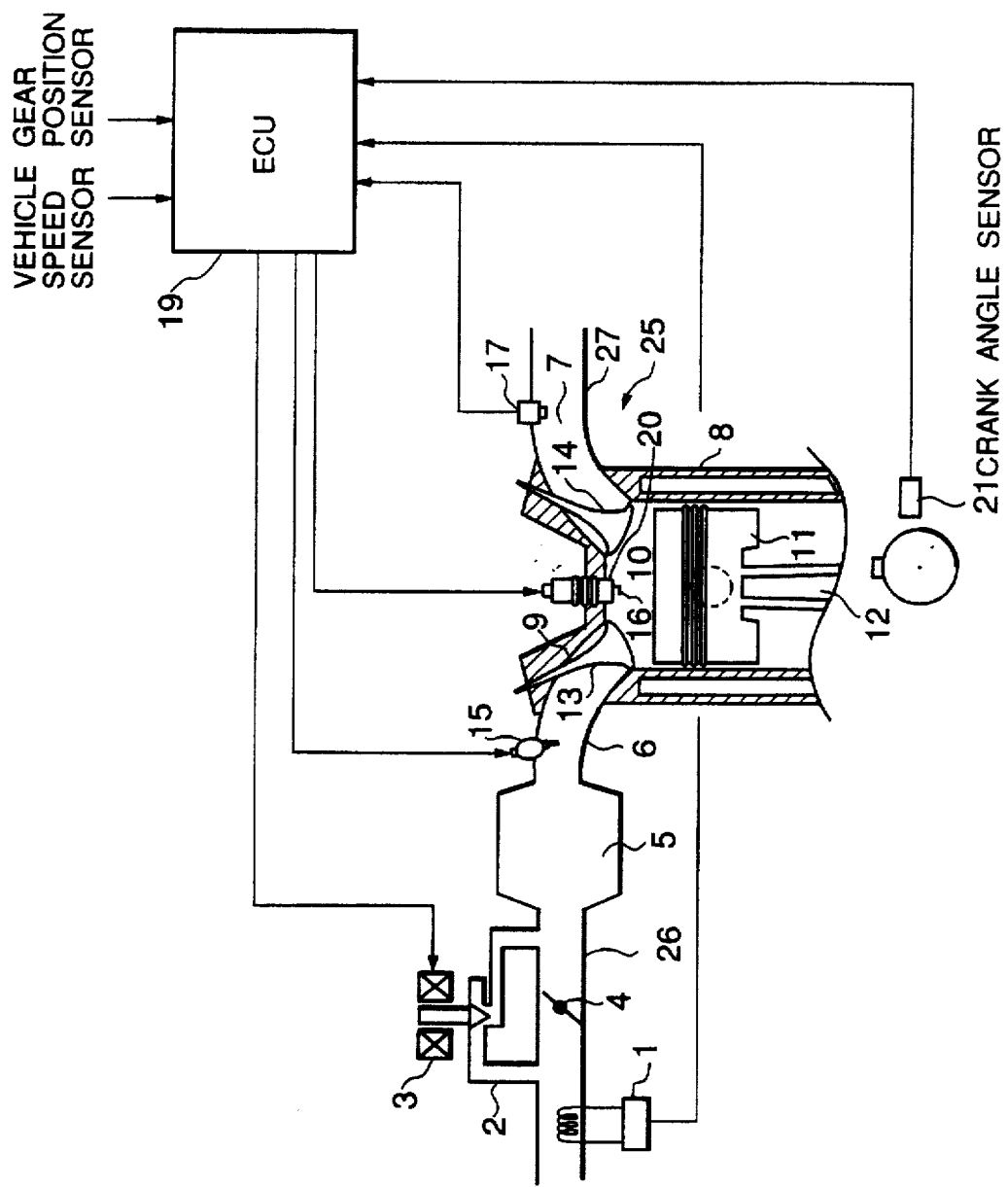
FIG. 1 is a schematic diagram of an idle rotation speed controller according to this invention.

Referring to FIG. 1 of the drawings, a multi-cylinder water-cooled automobile engine 25 aspirates air into a combustion chamber 10 of each cylinder from an intake passage 26 via a collector 5 and an intake manifold 6. A fuel injector 15 which injects fuel into this air is provided in the intake manifold 6. The intake air amount in the air passage 26 is adjusted by a throttle 4. A supplementary passage 2 provided with a supplementary air control valve 3 is provided as a bypass to the throttle 4. The intake air amount is measured by an air flow meter 1 situated in the intake passage 26 upstream of the throttle 4.

The combustion chamber 10 is formed inside an engine cylinder block 8. An intake valve 13 and exhaust valve 14 are provided in a cylinder head 9 facing the chamber 10. The air and fuel mixture aspirated into the chamber 10 is ignited by a spark plug 16 facing the chamber 10. The chamber 10 is partitioned by a piston 11 connected to a connecting rod 12. Combustion gases in the chamber 10 are ejected via the exhaust valve 14, an exhaust manifold 7 and an exhaust passage 27. An oxygen sensor 17 for detecting the oxygen concentration of the exhaust gas is provided in the exhaust passage 27.

A fuel injection amount and injection timing of a fuel injector 15, an ignition timing of the spark plug 16 and the operation of the supplementary air control valve 3 are controlled by a control unit 19. Signals corresponding to an intake air amount detected by the air flow meter 1 and the oxygen concentration in the exhaust passage 27 detected by the oxygen sensor 17 are input to the control unit 19 for this purpose.

Also input to the control unit 19 are signals from a crank angle sensor 21 attached to a crank shaft, not shown, which is connected to the connecting rod 12, a vehicle speed sensor, not shown, and a gear position sensor, not shown. The crank angle sensor 21 detects a predetermined engine rotation angle and rotation speed. The vehicle speed sensor detects a travel speed of the vehicle, and the gear position sensor detects a gear position of a vehicle transmission. The control by the control unit 19 includes control of ignition timing of the spark plug 16 so as to control the engine rotation speed to a target value in an idle running state.

According to this invention, this control process is divided into a high response process and a low response process to perform control accurately with fast response.

The high response process comprises a first feedback condition determination which determines whether or not the engine rotation speed is suitable for feedback control, a computation of a feedback correction amount, and execution of a feedback correction.

The low response process comprises a setting of a basic ignition timing during idle running of the engine, a second feedback condition determination which determines whether or not the engine running conditions are suitable for feedback control, and a setting of an idle target rotation speed.

Basically, a correction amount of the ignition timing which has the most effect on high response feedback control of the ignition timing is computed based on the most recent engine rotation speed information, and the computation results are reflected in the control of ignition timing and fuel injection timing of the cylinder which performs combustion on the next occasion. Since the other computations are based on earlier rotation speed information without referring to the most recent rotation speed information, the required time from acquisition of the most recent rotation speed information to feedback correction is shortened.

In the idle running state of the engine, the fuel is injected, for example, during an opening period of the intake valve. In the case of a direct injection engine, the fuel may be injected during a compression stroke of the piston. Ignition is generally performed in the vicinity of a compression top dead center of the piston. The measurement of engine rotation speed is performed at a time which precedes the ignition by at least the execution time of the high response process. It is preferable that this preceding time is as close as possible to the execution time of the high response process in order to increase the response of the ignition timing control. Increase/decrease of auxiliary air volume is another control factor relating to the variation of engine rotation speed, and the effect of variation of auxiliary air volume on increase/decrease of the torque generated by the engine has a large time delay compared to the effect of ignition timing on increase/decrease of the generated torque. Therefore, no correction of the auxiliary air volume is made in the high response process.

Next, the high response process will be described with reference to FIG. 2, and the low response process will be described with reference to FIG. 3.

The high response process is executed at a predetermined regular crank angle detected by the crank angle sensor 21. For example in a 4-cycle 6-cylinder engine, it is executed at every 120° of the crank angle. First, in a step S1, the engine rotation speed is detected. The engine rotation speed is obtained, for example, by measuring time intervals of the execution of this high response process. Further, by measuring the time required for one combustion cycle (720°) and dividing it by the number of cylinders (6), cyclic angular speed variations during the process may be eliminated.

Figure 3:
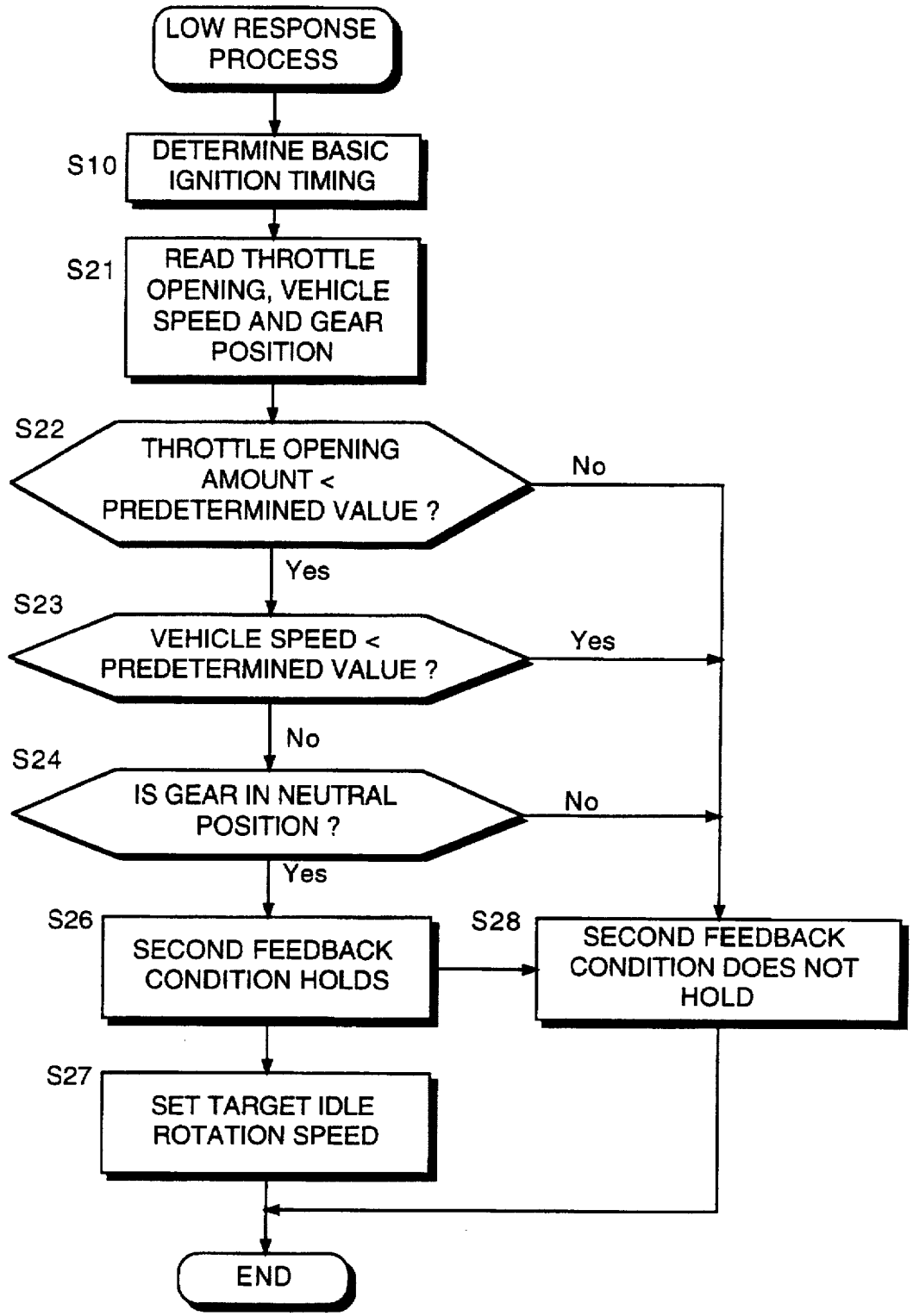
FIG. 3 is a flowchart describing a low response control process performed by the controller.

In a step S2 and subsequent steps, control is performed based on the determination result of the second feedback control condition performed in the low response process of FIG. 3.

Therefore the low response process will be described now, and the processing of the step S2 and subsequent steps of FIG. 2 will be described later.

The low response process of FIG. 3 is executed at intervals of for example 10 msec.

First, in a step S10, the basic ignition timing is determined based on the engine rotation speed, and the process of a step S21 and subsequent steps is executed.

In the step S21, a throttle opening, vehicle speed and gear position are read. In a step S22 it is determined whether or not the throttle is fully or nearly closed, by comparing the throttle opening amount with a predetermined value.

When the throttle opening amount is larger than the predetermined value, the routine proceeds to a step S28, and the fact that the second feedback condition does not hold is written into a predetermined register.

When the throttle opening is equal to or less than the predetermined value, it is determined in a step S23 whether or not the vehicle speed is less than a predetermined value. When the vehicle speed is equal to or greater than the predetermined value, the routine proceeds to the step S28.

When the vehicle speed is less than the predetermined value, it is determined in a step S24 whether or not the gear is in a neutral position. When the gear is in a position other than neutral, the routine proceeds to the step S28.

When the gear is in the neutral position, the routine proceeds to a step S26, and the fact that the second feedback condition holds is read into a predetermined register. Also, in a step S27, a target idle rotation speed is set and the process is terminated.

Figure 2:
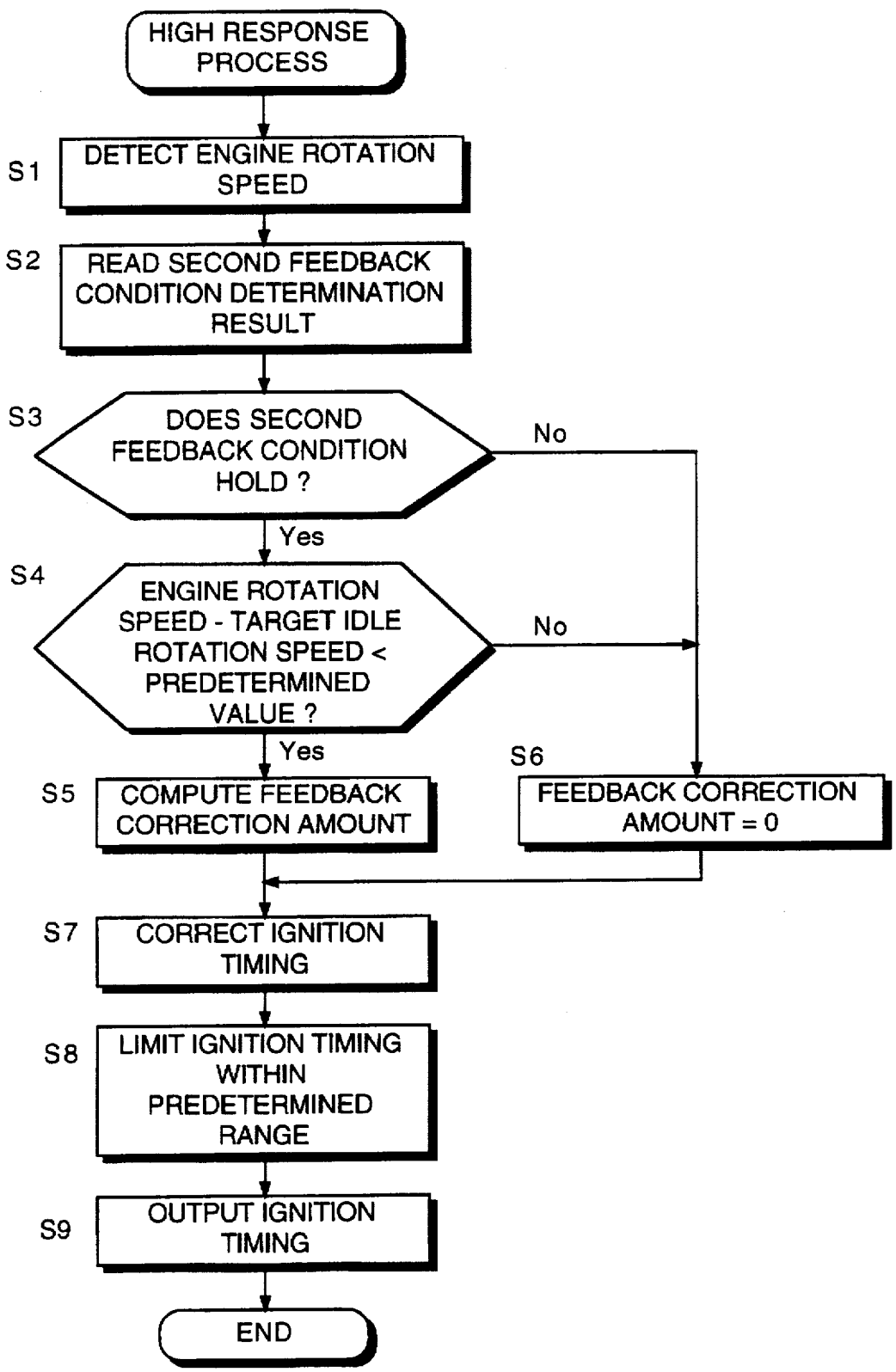
FIG. 2 is a flowchart describing a high response control process performed by the controller.

In the high response process of FIG. 2, the determination result of the second feedback condition is read from a register in the step S2, and it is determined whether or not the second feedback condition holds in a step S3.

When the second feedback condition holds, the routine proceeds to a step S4, and it is determined as the first feedback condition whether a difference between the engine rotation speed detected in the step S1 and the target rotation speed specified in the step S27, is less than a predetermined value.

When this difference is less than the predetermined value, a feedback correction amount is computed in a step S5, and when this difference is greater than the predetermined value, the feedback correction amount is set to 0 in a step 6. In a step S7, the ignition timing is corrected based on the set feedback correction amount.

Feedback control is therefore performed only when both the first and second feedback conditions hold.

The correction amount computed in the step S5 is a correction amount required to generate for example a torque increase/decrease proportional to the difference between the target rotation speed and the detected most recent rotation speed so that this difference is nullified.

Herein, the rotation speed used in the step S10 and the rotation speed used in the step S4 are both values measured In the step S1, however the measurement times are different. Specifically, when the same value is used in the low response process of the step S10 of FIG. 3 which is executed only once every 10 ms and in the high response process of the step S4 which is executed a plurality of times for each engine rotation, the rotation speed information used in the step S4 is too old. For this reason in the step S4, the latest rotation speed measured In the step S1 is used immediately after starting the high response process in the step S4, while consequently in the step S10, the rotation speed measured at a plurality of occasions beforehand is used.

Figure 4:
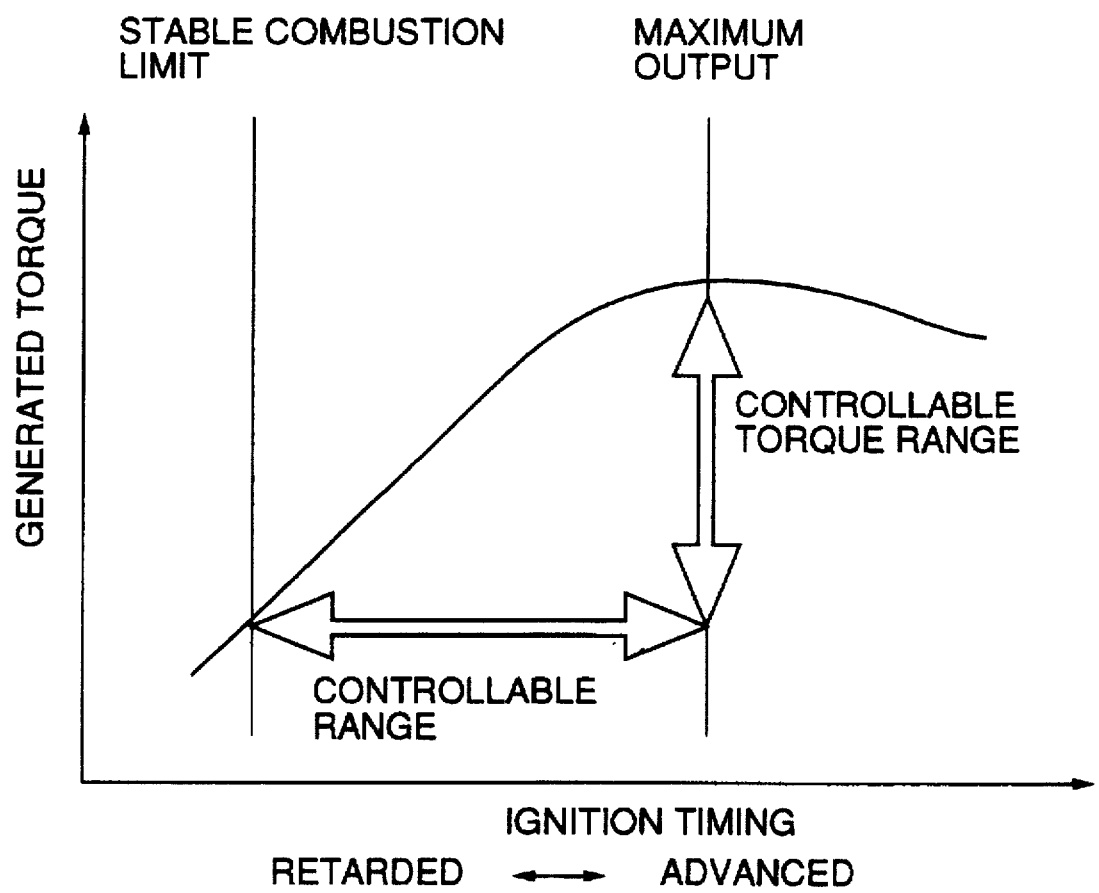
FIG. 4 is a diagram showing a general relation between an engine ignition timing and a generated torque.

FIG. 4 shows how the torque generated by the engine varies when the ignition timing is advanced or retarded.

Herein, the interval from the stability limit of engine running to the point at which maximum torque is generated is the control range of the ignition timing. When the detected rotation speed in the step S4 is less than the target rotation speed, an ignition timing correction amount which advances the ignition timing according to the difference is computed so as to increase the rotation speed in the step S5.

In a step S7, the ignition timing is computed based on the feedback correction amount computed as described above.

In a step S8, it is determined whether or not the ignition timing in FIG. 4 is situated between the maximum torque ignition timing and stable combustion limit. When the ignition timing is out of this range, the ignition timing is reset to the above limit values. For example, when the ignition timing exceeds the stable combustion limit, the ignition timing is limited to the stable combustion limit. This maintains engine running stability.

The final ignition timing obtained by this process is output to a job which performs ignition in the step S9. As the ignition timing feedback control is divided into a high response process and low response process comprising the setting of a basic ignition timing as described hereinabove, the time required for feedback control is shortened. Further, by setting the rotation speed detection timing based on the shortened feedback control time, feedback control may be performed based on the latest rotation speed. As a result, a correction may be applied from the next cylinder in which combustion will occur, and there is a good response in the generated torque.

Figures 6A, 6B:
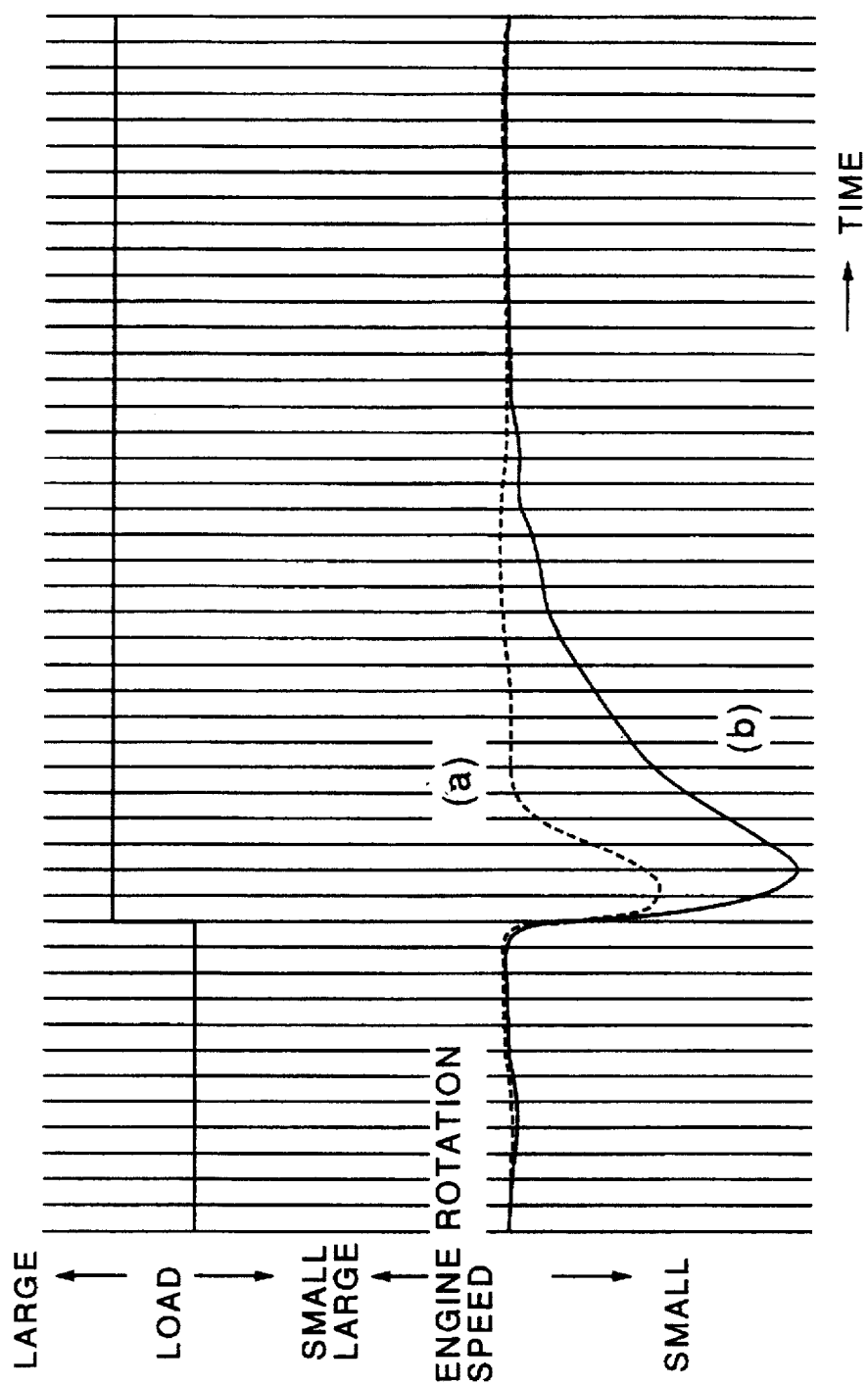
FIGS. 6A and 6B are diagrammatic charts showing relations between variations of engine load and rotation speed in the idle state and a time from detection of rotation speed to an ignition timing correction according to the controller.

FIGS. 6A and 6B show the variation of engine load and rotation speed due to the aforesaid ignition timing control. Herein, the ignition timing is proportionally controlled according to the difference between the target rotation speed during idle running and the actual rotation speed, and the auxiliary air flowrate is controlled according to the integral of the difference. In curve (b) of FIG. 6B, the time period from when the rotation speed is measured to when the ignition timing is controlled is set to be 120° longer than for the curve (a).

As can be seen from the figures, when the engine load varies slightly in the idle running state and the rotation speed temporarily drops, a much longer time is required in (b) than in (a) to restore the rotation speed to the target speed, and the drift of the rotation speed from the target speed during this period is larger as well. In other words, by shortening the time required for feedback control based on rotation speed information and using the latest rotation speed information as far as possible, recovery from variations of rotation speed is rapid.

In general, in order to control the torque generated in a cylinder in which combustion is to occur next based on rotation speed information for a cylinder in which combustion occurred on the immediately preceding occasion, a high performance, high speed CPU is needed. According to this invention, however, by limiting the computation which is performed from when the rotation speed is measured to when the ignition timing signal is output, to factors which have a particularly large effect on the control amount, and by appropriately setting the measurement timing of rotation speed to match the computation time, an ignition timing control with a satisfactorily high level of response may be performed even without a high performance CPU.

According to the aforesaid embodiment, this invention has been described insofar as concerns its application to ignition timing control, but it may be applied in exactly the same way to fuel injection control.

Figure 5:
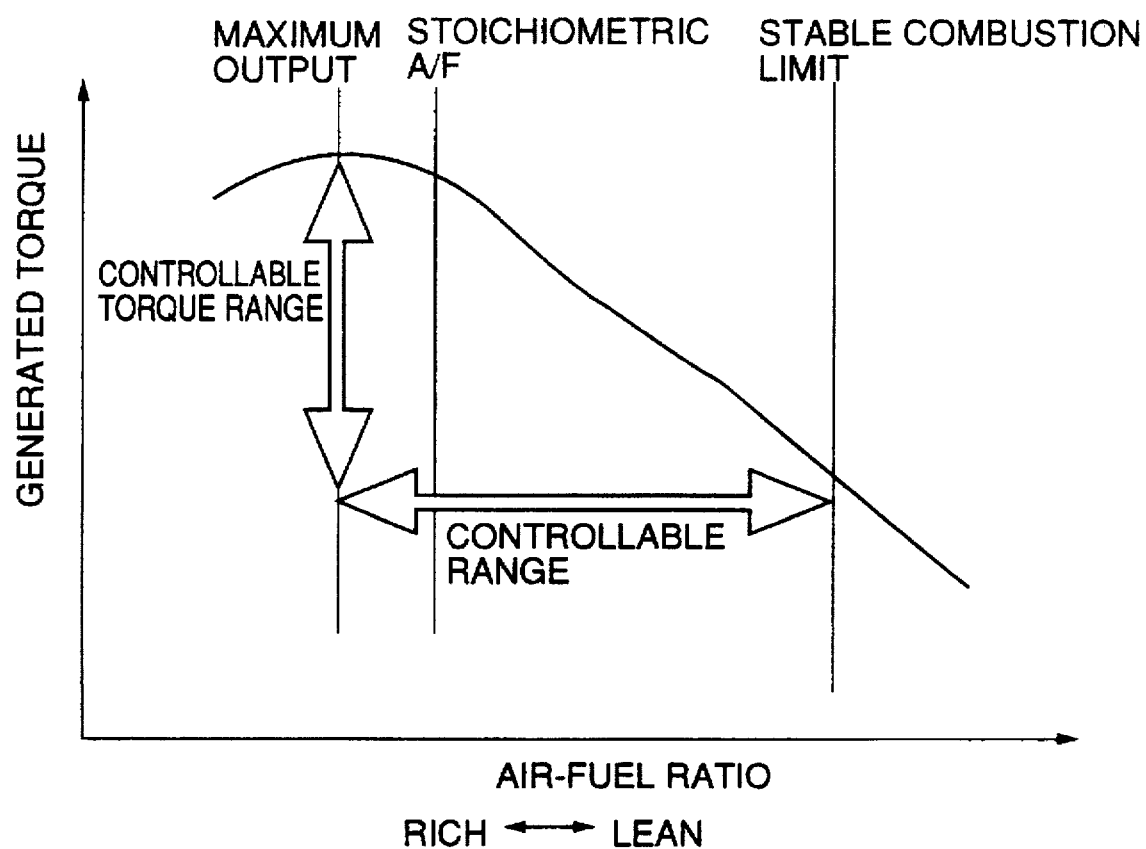
FIG. 5 is a diagram showing a general relation between an engine air-fuel ratio and the generated torque.

In this case, by changing the ignition timing in the steps S7–S9 to a fuel injection amount, and the basic ignition timing in S10 to a basic fuel injection amount, the identical control process may be applied for the control of fuel injection amount during the idle engine running state. FIG. 5 shows a relation between air-fuel ratio and increase/decrease of generated torque. It is clear from this figure that the generated torque decreases as the air-fuel ratio becomes leaner. When the detected rotation speed is less than the target rotation speed, a fuel injection correction amount is computed in the step S5 such that the fuel injection amount increases according to the difference. In this case, the variation range of injection amount extends from the maximum output air-fuel ratio to the stable combustion limit. In the step S8, the injection amount corrected in the step S7 is limited to this variation range.

It should however be noted that the optimum measurement timing of the engine rotation speed is different from the control of ignition timing and control of fuel injection amount.

When the ignition timing is feedback controlled, control is set to the shortest timing which precedes compression top dead center by a time equal to or longer than the execution time of the high response process. Moreover when the fuel injection amount is feedback controlled, the fuel injection timing is set to the shortest timing which precedes the timing of fuel supply to the engine as starting point by a time equal to or longer than the execution time of the high response process. In the case of a direct injection engine, fuel may be injected during the compression process whereas in the case of a non-direct injection engine, it may be supplied during the intake stroke of the piston.

The embodiments of this invention in which an exclusive property or privilege is claimed are defined as follows:

1. A controller for feedback control of a rotation speed of an engine to a target rotation speed during an idle running state of said engine, comprising:
   means for periodically measuring a rotation speed of said engine during said idle running state, means for setting a basic engine combustion condition during said idle running state based on said measured rotation speed,
   means for setting a target rotation speed of said engine during said idle running state, and
   means for executing a feedback correction process which corrects said basic engine combustion condition such that said measured rotation speed coincides with said target rotation speed,
   wherein, a time period from rotation speed measurement by said measuring means to completion of said feedback correction process being equal to or longer than a time required to perform said feedback correction process, but shorter than a time required from setting of said basic engine combustion condition to the completion of said feedback correction process.

2. An idle rotation controller as defined in claim 1, wherein the time period from said rotation speed measurement to the completion of said feedback correction process is set approximately equal to the time required to perform said feedback correction process.

3. An idle rotation controller as defined in claim 1, wherein said basic engine combustion condition setting means sets said basic engine combustion condition based on a rotation speed measured prior to the latest measurement of rotation speed.

4. An idle rotation controller as defined in claim 1, wherein said basic combustion condition is an ignition timing of fuel supplied to said engine, and said completion of said feedback correction process is set to be in the vicinity of compression top dead center in an engine cylinder.

5. An idle rotation controller as defined in claim 1, wherein said basic combustion condition is a fuel supply amount to said engine, and said completion of said feedback correction process is set equal to a fuel supply timing to said engine.

6. An idle rotation controller as defined in claim 1, wherein said feedback correction process comprises a process which determines whether or not to perform feedback correction based on a rotation speed measured on an immediately preceding occasion.

7. An idle rotation controller as defined in claim 1, further comprising means for determining whether or not to perform feedback correction based on conditions other than engine rotation speed, and when said means determines that said feedback correction should not be performed, said feedback correction process sets a correction amount by said feedback correction process to 0.

8. An idle rotation controller as defined in claim 1, wherein said feedback correction process comprises a process for limiting a correction amount by said feedback correction process to a predetermined tolerance range.

\* \* \* \* \*